US012674871B2

(12) United States Patent
Assmann

(10) Patent No.: US 12,674,871 B2
(45) Date of Patent: Jul. 7, 2026

(54) TIME-OF-FLIGHT RISING EDGE ADAPTIVE CROSS-TALK CORRECTION

(71) Applicant: STMicroelectronics International N.V., Geneva (CH)

(72) Inventor: Andreas Assmann, Edinburgh (GB)

(73) Assignee: STMicroelectronics International N.V., Geneva (CH)

( * ) Notice: Subject to any disclaimer, the term of this patent is extended or adjusted under 35 U.S.C. 154(b) by 454 days.

(21) Appl. No.: 18/348,600

(22) Filed: Jul. 7, 2023

(65) Prior Publication Data

US 2025/0012901 A1      Jan. 9, 2025

(51) Int. Cl.
*G01S 7/4865*          (2020.01)

(52) U.S. Cl.
CPC .................................. *G01S 7/4865* (2013.01)

(58) Field of Classification Search
CPC ...... G01S 7/4865; G01S 7/4876; G01S 17/10;
G01S 7/4866; G01S 7/495
See application file for complete search history.

(56) References Cited

U.S. PATENT DOCUMENTS 9,786,701 B2    10/2017  Mellot et al.
9,960,295 B2     5/2018  McLeod et al.

10,796,191 B2 *  10/2020  De Salivet de Fouchecour ..........
                                                            G01S 17/04
11,320,514 B2     5/2022  Keller et al.
2017/0115381 A1   4/2017  Moore et al.
2018/0253404 A1   9/2018  Moore et al.
2020/0271765 A1 *  8/2020  Glover .................. G01S 7/4876
2022/0043118 A1 *  2/2022  Pacala ................... G01S 7/4863
2022/0187431 A1   6/2022  McLeod et al.
2024/0288557 A1   8/2024  Mcleod et al.
2024/0353538 A1  10/2024  Assmann

FOREIGN PATENT DOCUMENTS

EP            3370078 A1 *  9/2018  ............. G01S 17/10

* cited by examiner

*Primary Examiner* — Kyle R Quigley
*Assistant Examiner* — Ryan James Stear
(74) *Attorney, Agent, or Firm* — Slater Matsil, LLP

(57)          ABSTRACT

A method of operating a time-of-flight (ToF) ranging system includes: receiving a histogram that includes a cross-talk signal generated by reflected light pulses from a cover glass of the ToF ranging system; finding, in a first region of the histogram, a first rising edge having a gradient that is larger than a threshold or is a maximum gradient in the first region, where the first rising edge is in a first histogram bin having a first value; determining a second value of a second histogram bin in the first region, where the first histogram bin precedes the second histogram bin by a pre-determined distance; estimating a ratio between the first region of the histogram and a pre-stored light pulse shape based on the first value and the second value; scaling the pre-stored light pulse shape with the estimated ratio; and subtracting the scaled pre-stored light pulse shape from the histogram.

20 Claims, 11 Drawing Sheets

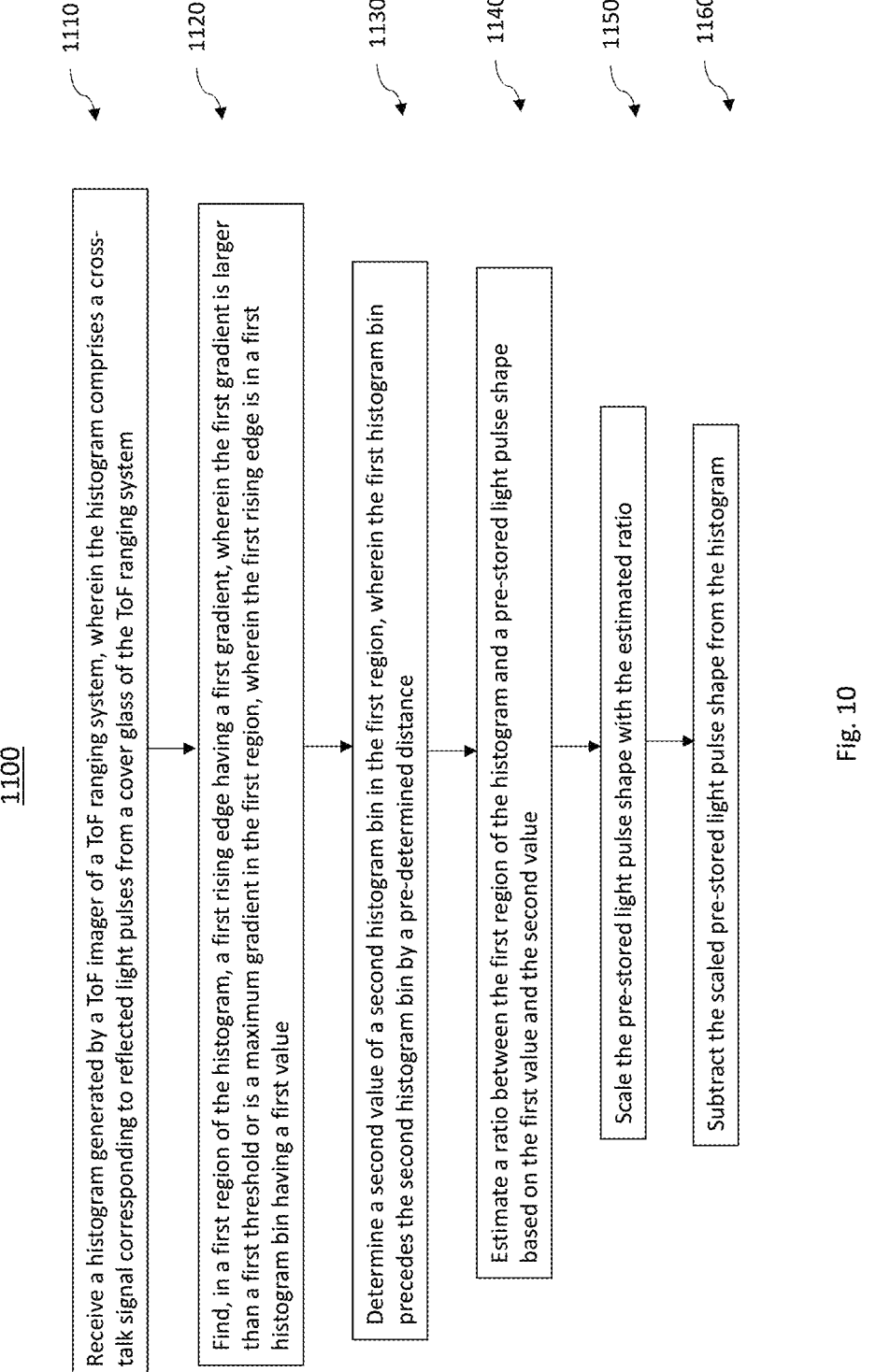

1100

1110 — Receive a histogram generated by a ToF imager of a ToF ranging system, wherein the histogram comprises a cross-talk signal corresponding to reflected light pulses from a cover glass of the ToF ranging system 1120 — Find, in a first region of the histogram, a first rising edge having a first gradient, wherein the first gradient is larger than a first threshold or is a maximum gradient in the first region, wherein the first rising edge is in a first histogram bin having a first value 1130 — Determine a second value of a second histogram bin in the first region, wherein the first histogram bin precedes the second histogram bin by a pre-determined distance 1140 — Estimate a ratio between the first region of the histogram and a pre-stored light pulse shape based on the first value and the second value 1150 — Scale the pre-stored light pulse shape with the estimated ratio 1160 — Subtract the scaled pre-stored light pulse shape from the histogram

Fig. 10

TIME-OF-FLIGHT RISING EDGE ADAPTIVE CROSS-TALK CORRECTION

TECHNICAL FIELD

The present invention relates generally to time-of-flight (ToF) ranging systems, and in particular embodiments, to ToF ranging systems capable of adaptively removing a cross-talk signal from the histogram for better target detection and estimation.

BACKGROUND

Time-of-flight (ToF) imagers (also referred to as ToF sensors) have been widely used recently for various applications, such as gesture/facial recognition, light detection and ranging (LiDAR), virtual reality, augmented reality, and autonomous robotics. A ToF ranging system uses a ToF imager to measure the distance of an object (e.g., a target). To measure an object, the ToF ranging system instructs the ToF sensor to send a light signal (e.g., light pulses) towards the object and measures the time taken by the signal to travel to the object and back.

Single photon avalanche diode (SPAD) may be used as a detector of reflected light. In some applications, an array of SPADs is provided as a sensor (e.g., an SPAD array) in order to detect a reflected light pulse. A reflected photon may generate a carrier in the SPAD through the photo electric effect. The photon-generated carrier may trigger an avalanche current in one or more of the SPADs in an SPAD array. The avalanche current may signal an event, namely that a photon has been detected. Information related to the reflected intensity, also referred to as "signal count," is output as histograms of the SPAD array. The histogram for each SPAD includes a plurality of histogram bins, where each histogram bin corresponds to a distance (or a narrow range of distance) from the SPAD array, and the value (e.g., signal count) of each histogram bin corresponds to the number of detected avalanche current events (e.g., number of detected photons).

The histogram from the SPAD needs to be processed to extract useful information, such as the number of targets detected, the distances of the targets, and so on. Challenges remain in the processing of the histogram. For example, the light pulses reflected from the cover glass of the ToF ranging system generates a cross-talk signal in the histogram. The cross-talk signal needs to be removed from the histogram before target detection and estimation can be performed reliably. In addition, the processing of histogram is usually computationally intensive and is often performed by an off-chip processor that is located in a different semiconductor die from the semiconductor die having the SPAD array. Efficient processing for the histogram of the SPAD is needed to reduce computational complexity and to enable higher-level of integration for ToF imagers and/or ToF ranging systems.

SUMMARY

In an embodiment, a method of operating a time-of-flight (ToF) ranging system includes: receiving a histogram generated by a ToF imager of the ToF ranging system, wherein the histogram comprises a cross-talk signal corresponding to reflected light pulses from a cover glass of the ToF ranging system; finding, in a first region of the histogram, a first rising edge having a first gradient, wherein the first gradient is larger than a first threshold or is a maximum gradient in the first region, wherein the first rising edge is in a first histogram bin having a first value; determining a second value of a second histogram bin in the first region, wherein the first histogram bin precedes the second histogram bin by a pre-determined distance; estimating a ratio between the first region of the histogram and a pre-stored light pulse shape based on the first value and the second value; scaling the pre-stored light pulse shape with the estimated ratio; and subtracting the scaled pre-stored light pulse shape from the histogram.

In an embodiment, a method of operating a time-of-flight (ToF) ranging system includes: generating, by a ToF sensor of the ToF ranging system, a histogram, wherein the histogram comprises a cross-talk signal generated by a reflected light signal from a cover glass of the ToF ranging system; and removing the cross-talk signal from the histogram, comprising: estimating gradients of histogram bins in a first region of the histogram by computing differences between adjacent histogram bins; finding, in a first histogram bin in the first region of the histogram, a first rising edge, wherein the first histogram bin has a first value, and a gradient of the first histogram bin is larger than a threshold or is a maximum gradient in the first region; determining a second value of a second histogram bin in the first region, wherein the second histogram bin is behind the first histogram bin by a pre-determined number; computing a scaling factor for a pre-stored pulse shape based on the first value and the second value; scaling the pre-stored pulse shape with the scaling factor; and subtracting the scaled pre-stored pulse shape from the histogram.

In an embodiment, a time-of-flight (ToF) ranging system includes: a ToF sensor configured to emitted light pulses and to generate a histogram based on reflected light pulses; and a processor coupled to the ToF sensor, wherein the processor is configured to: find, in a first region of the histogram, a rising edge having a gradient, wherein the gradient is larger than a threshold or is a maximum gradient in the first region, wherein the rising edge is in a first histogram bin having a first value; determine a second value of a second histogram bin in the first region, wherein the first histogram bin precedes the second histogram bin by a pre-determined number; estimate, based on the first value and the second value, a ratio between the first region of the histogram and a pre-stored light pulse shape; scale the pre-stored light pulse shape with the estimated ratio; and subtract the scaled pre-stored light pulse shape from the histogram.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, the same or similar reference numerals generally designate the same or similar component parts throughout the various figures, which will generally not be re-described in the interest of brevity. For a more complete understanding of the invention, reference is now made to the following descriptions taken in conjunction with the accompanying drawings, in which:

FIG. 10 illustrates a flow chart of a method of operating a ToF ranging system.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described in the context of time-of-flight (ToF) ranging systems, and in particular embodiments, to ToF ranging system capable of adaptively removing a cross-talk signal from the histogram for better target detection and estimation.

Figure 1:
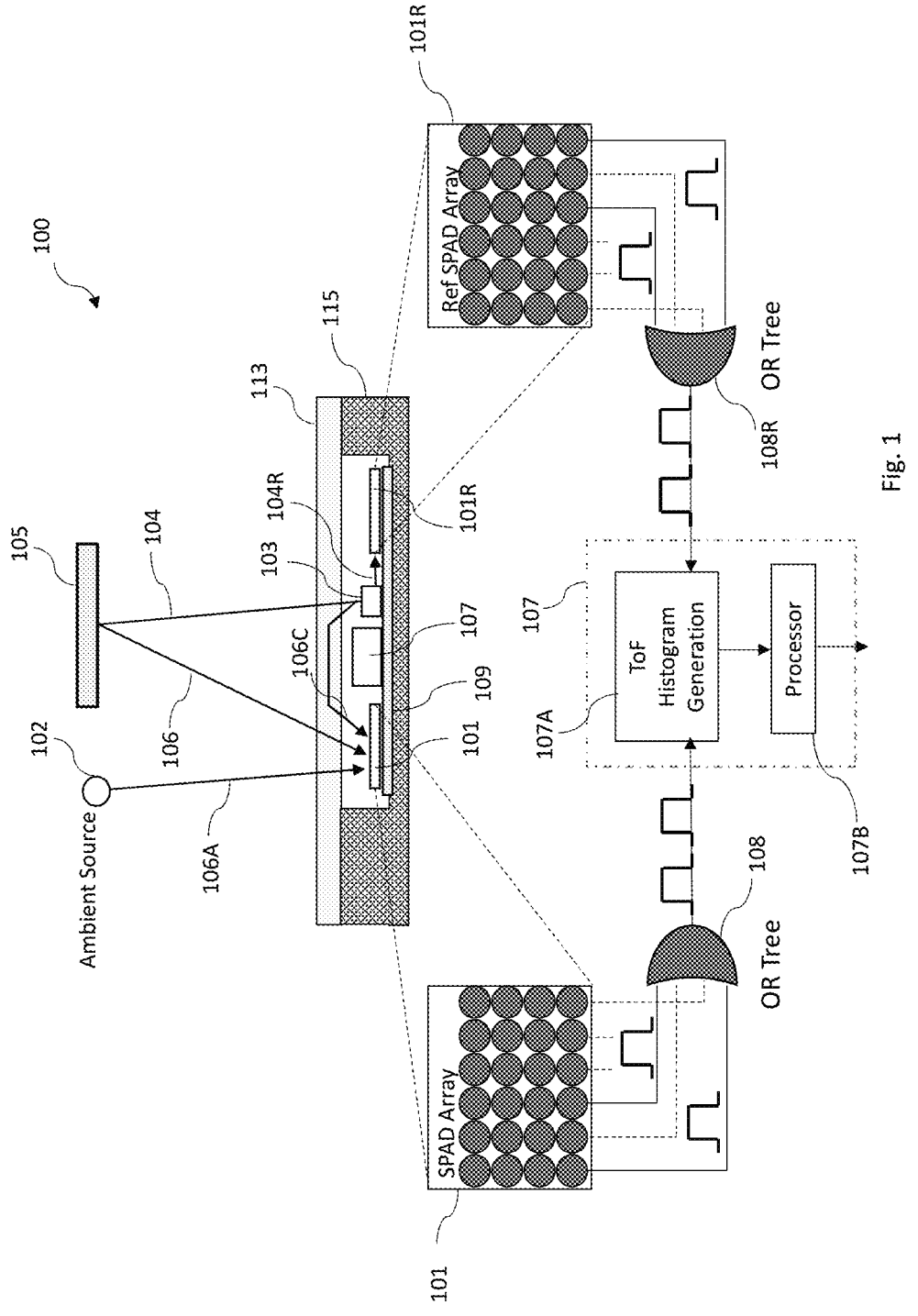
FIG. 1 illustrates a time-of-flight (ToF) ranging system, in an embodiment.

FIG. 1 illustrates a time-of-flight (ToF) ranging system 100, in an embodiment. Note that for simplicity, not all features of the ToF ranging system 100 are illustrated. In addition, to facilitate discussion, FIG. 1 illustrates an object 105 (e.g., a target) and an ambient source 102, with the understanding that the object 105 and the ambient source 102 are not part of the ToF ranging system 100. The upper portion of FIG. 1 illustrates the cross-sectional view of the ToF ranging system 100, while the lower portion of FIG. 1 illustrates details of some components of the ToF ranging system 100, such as the top views of SPAD array 101 and reference SPAD array 101R, the output pulses (e.g., indicating avalanche current events) generated by the SPADs in the SPAD array 101 and the reference SPAD array 101R, the OR trees used to combine the output pulses, and details of processing unit 107.

As illustrated in FIG. 1, the ToF ranging system 100 includes a SPAD array 101, a reference SPAD array 101R, a light source 103 (also referred to as an emitter), and a processing unit 107 attached to a substrate 109 (e.g., a printed circuit board (PCB), an interposer, or the like). FIG. 1 further illustrates an assembly housing 115 (e.g., a protective case, a box, a shell, or the like). The SPAD array 101, the reference SPAD array 101R, the light source 103, the processing unit 107, and the substrate 109 are located inside a space surrounded by the assembly housing 115. A cover glass 113 is attached to upper surfaces of the sidewalls of the assembly housing 115, thereby forming an enclosed space to protect the components disposed within the space. The attachment of the cover glass 113 to the assembly housing 115 shown in FIG. 1 is merely a non-limiting example. The cover glass 113 may be attached by any suitable method.

The light source 103 is a circuit configured to generate a light signal 104 for illuminating an object 105 (e.g., a target). The light source 103 may be, e.g., a vertical-cavity surface-emitting laser (VCSEL) device, a light-emitting diode (LED), an infra-red (IR) device, or the like. The light signal 104 may include a plurality of light pulses. The reflected light signal 106 from the object 105 is received by the SPAD array 101. The SPAD array 101 includes a plurality of SPADs arranged in, e.g., rows and columns. In the example of FIG. 1, the reference SPAD array 101R receives a reference light signal 104R from the light source 103, and provides a reference SPAD output. The reference SPAD output and the SPAD output (e.g., output of the SPAD array 101) are sent to a ToF histogram generation circuit 107A to generate a histogram (also referred to as a ToF histogram). Methods for generating a histogram using a SPAD array and a reference SPAD array are known in the art, details are not discussed here. For example, US20170115381 discloses circuits and methods for generating histogram using a SPAD array and a reference SPAD array. US20170115381 is incorporated by reference herein.

In the example of FIG. 1, the ToF histogram generation circuit 107A is part of the processing unit 107. The processing unit 107 also includes a processor 107B, which receives and processes the histogram. The processor 107B may be, e.g., a micro-controller, a digital signal processor (DSP), an Application-Specific Integrated Circuit (ASIC), or the like. The processor 107B processes the histogram to extract useful information, such as number of target(s) in the histogram, the distance of each target, and so on. In an example embodiment, the processor 107B is configured to execute the method disclosed hereinafter to remove the cross-talk signal from the histogram, and may further be configured to estimate the distance of one or more targets using the histogram after removing the cross-talk signal. In some embodiments, the ToF histogram generation circuit 107A and the processor 107B are integrated together in a same semiconductor die (e.g., as a single integrated-circuit (IC) die). In other embodiments, the ToF histogram generation circuit 107A and the processor 107B are formed in different (e.g., separate) semiconductor dies. These and other variations are fully intended to be included within the scope of the present disclosure.

FIG. 1 illustrates a cross-talk signal 106C, which represents light signal reflected by the cover glass 113 and received by the SPAD array 101. The cross-talk signal 106C is received by the SPAD array 101 and generates a corresponding pulse region in the histogram. In the discussion herein, the pulse region in the histogram corresponding to (e.g., generated by) the cross-talk signal 106C is referred to as a cross-talk signal in the histogram, or simply a cross-talk signal. In order to correctly and reliably perform target detection and estimation, the cross-talk signal in the histogram needs to be removed. A cross-talk cancellation method is disclosed hereinafter.

The components used for emitting light signal, receiving reflected light signal, and generating the histogram, which components include the light source 103, the SPAD array 101, the reference SPAD array 101R, and the ToF histogram generation circuit 107A, are collectively referred to as an ToF imager (also referred to as a ToF sensor), in some embodiments. Therefore, the ToF ranging system 100 includes the ToF imager and the processor 107B, and the processor 107B processes the histogram generated by the ToF imager.

FIG. 1 illustrates the light source 103, the SPAD array 101, the reference SPAD array 101R, and the processing unit 107 as separate components attached to the substrate 109. This is merely a non-limiting example. In some embodiments, the light source 103, the SPAD array 101, the reference SPAD array 101R, and the ToF histogram generation circuit 107A are integrated into a single IC die as an integrated ToF imager. In some embodiments, the light source 103, the SPAD array 101, the reference SPAD array 101R, the ToF histogram generation circuit 107A, and the processor 107B are integrated into a single IC die as an integrated ToF ranging system. These and other variations are fully intended to be included within the scope of the present disclosure.

Figure 2:
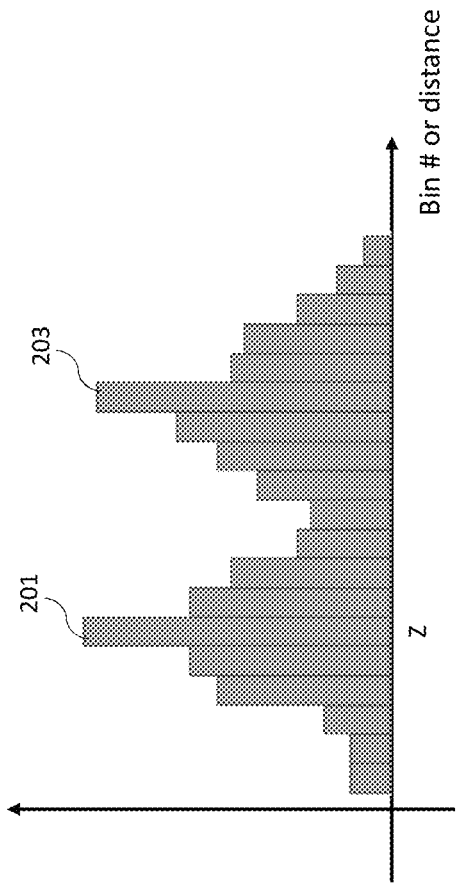
FIG. 2 illustrates a histogram generated by a ToF imager, in an embodiment.

FIG. 2 illustrates a histogram generated by a ToF imager, in an embodiment. The histogram in the example of FIG. 2 has a plurality of bins (also referred to as histogram bins). The value of each bin (e.g., along y-axis) of the histogram represents the signal count within a duration (e.g., a fixed duration) of the bin. The location (e.g., along x-axis), or the index number, of each bin of the histogram corresponds to a distance (or a narrow range of distance) from the SPAD array 101. During histogram processing, when a target is identified as being located in a histogram bin, the distance of that histogram bin is used as the distance of the target (e.g., distance between the SPAD array 101 and the target). In the discussion herein, it is assumed that the light source 103 and the SPAD array 101 are co-located such that the distance between the SPAD array 101 and the target is considered same as the distance between the light source 103 and the target.

For ease of discussion, each bin of the histogram is assigned a distance (e.g., a distance corresponding to the center of the bin), and the distance corresponding to a bin is also referred to as the distance of the bin, or bin distance. The index of the bin, also referred to as bin index or bin number, may be used to indicate the distance of the bin. For example, assuming that the first bin (e.g., the leftmost bin, or the earliest bin) of the histogram has an index of 1, the second bin has an index of 2, and so on, then the distance of the i-th bin may be calculated as $((i-1)+0.5)D_{BIN}$, where $D_{BIN}$ is the distance traveled by the light signal during a duration that is equal to half of a time interval T, and the time interval T is the duration of a histogram bin. The time interval T is also referred to as bin time width, and the distance $D_{BIN}$ is also referred to as the bin width $D_{BIN}$. Note that the time interval T represents a round-trip time of the light signal. In the example of FIG. 2, the histogram includes two pulse regions. The pulse region 201 is generated by (e.g., corresponds to) the cross-talk signal 106C, and the pulse region 203 is generated by (e.g., corresponds to) reflected light signal from a target. In the example of FIG. 2, the peak of the pulse region 201 is at a histogram bin with bin index Z. The distance of the histogram bin with bin index Z represents the distance between the ToF emitter and the cover glass, and the histogram bin with bin index Z is referred to as the reference zero-point histogram bin. In general, given a particular design of the ToF ranging system 100, the distance $D_{CG}$ between the ToF emitter and the cover glass is known, and therefore, the location (e.g., bin number) of the reference zero-point histogram bin can be estimated based on the distance $D_{CG}$ and the bin width $D_{BIN}$ (e.g., $D_{CG}/D_{BIN}$).

In order to reliably detect the number of targets in the histogram and/or estimate the distance of the target(s) in the histogram, the cross-talk signal in the histogram needs to be removed. Otherwise, the cross-talk signal in the histogram may be incorrectly identified as a target, or may merge (e.g., partially merge or fully merge) with a pulse region in the histogram that corresponds to a target and distort that pulse region. The distorted pulse region may cause error or inaccuracy in target detection and estimation.

Typically, the cross-talk signal is removed from the histogram based on the worst-case scenario with a further margin of safety. For example, for a particular ToF ranging system, the reflection from the particular cover glass used is measured for a sample size of cover glasses in a characterization or calibration process. Based on the measurements, the worst-case scenario of observed cross-talk signal is identified, and a cancellation scheme is designed to remove (e.g., cancel out) the worst (e.g., strongest) cross-talk signal observed during the calibration process, e.g., by subtracting a known light pulse shape with a fixed amplitude from the histogram, where the fixed amplitude is chosen based on the strongest cross-talk signal observed during the calibration process. When the actual cross-talk signal in the histogram is not the worst-case scenario, this cancellation scheme often results in severe over-correction, causing non-linearities in the short range of the histogram. Another issue with the existing cross-talk cancellation scheme is that the correction scheme is static, and cannot correct cross-talk beyond the designed limit or adapt to the individual condition of each cover glass. During the lifetime of the ToF ranging system, debris or smudge may be applied to the cover glass in operation and can change dynamically (e.g., smudge being applied on the cover glass and cleaned a few minutes later). The cover glass may get scratched or degrade over time, thus changing its reflectance over time. The calibration process is done once, and the measurements may not represent the condition of another batch of cover glasses. A method of removing cross-talk signal from the histogram dynamically based on the actual histogram can resolve the above challenges discussed. An example embodiment is discussed hereinafter with reference to FIGS. 3-5.

Figure 3:
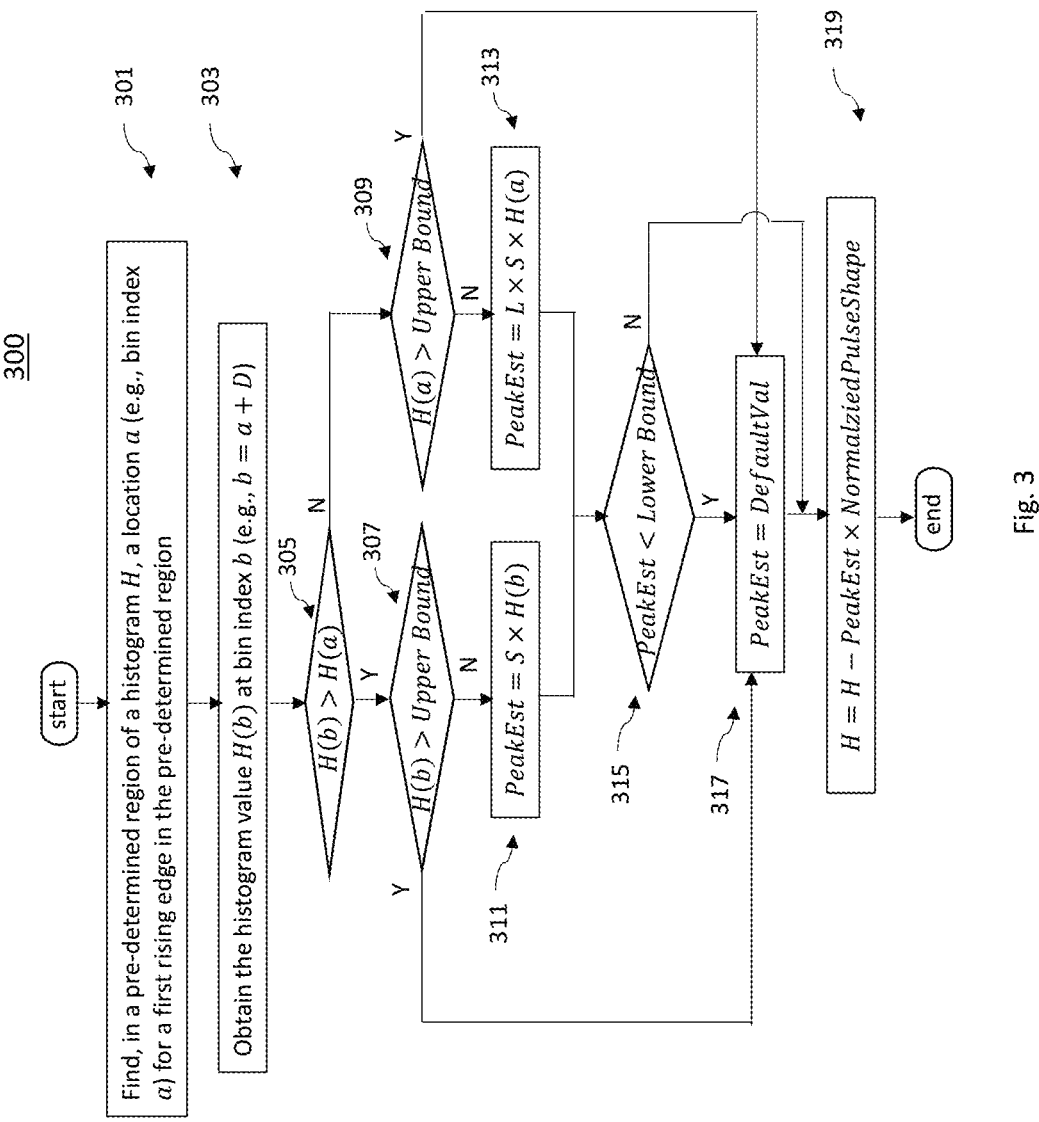
FIG. 3 illustrates a flow chart of a method of cross-talk cancellation, in an embodiment.

FIG. 3 illustrates a flow chart of a method 300 of cross-talk cancellation, in an embodiment. Discussion of the method 300 herein refers to FIGS. 4 and 5, which illustrate histograms and some of the concepts used in the method 300 of FIG. 3. It should be understood that the embodiment method shown in FIG. 3 is merely an example of many possible embodiment methods. One of ordinary skill in the art would recognize many variations, alternatives, and modifications. For example, various steps as illustrated in FIG. 3 may be added, removed, replaced, rearranged, or repeated.

Referring to FIG. 3, at block 301, a location a (e.g., bin index a) for a first rising edge is found in a pre-determined region of a histogram H. The pre-determined region of the histogram H include histogram bins around (e.g., before and after) the reference zero-point histogram bin. Denote the bin number of the reference zero-point histogram bin as M, the pre-determined region may be histogram bins with bin numbers between $M-N_1$ and $M+N_2$, where $N_1$ and $N_2$ are positive numbers, such as 4. The positive numbers $N_1$ and $N_2$ may or may not be the same. In some embodiments, the pre-determined region may be histogram bins with bin numbers between 1 and $M+N_2$, assuming that the first histogram bin has a bin number of 1. For ease of discussion and without loss of generality, the boundaries, e.g., start bin index and stop bin index, of the pre-determined region of the histogram H are denoted as bin index Start and bin index Stop, respectively.

In some embodiments, the first rising edge in the pre-determined region is the leftmost (e.g., the earliest-arriving) rising edge in the pre-determined region with a gradient that is larger than a pre-determined threshold TH, or is the maximum gradient in the pre-determined region. The gradient of the first rising edge is indicated by the value of a corresponding histogram bin (e.g., having a same bin index a) in a differential histogram DH, where the differential histogram DH is generated from the histogram H.

In some embodiments, the differential histogram DH is generated by computing differences between adjacent bins of the histogram H, and values of the differential histogram DH indicate gradients at the bins of the histogram H. In an example embodiment, the differential histogram is generated by computing differences between adjacent bins of the histogram, and assigning the computed differences to respective bins of the differential histogram. For example, denoted the value of the i-th bin of the histogram as H(i), and denote the value of the i-th bin of the differential histogram as DH(i), then DH(i) may be calculated as DH(i)=H(i)−H(i−1). In some embodiments, assuming the index of the histogram bins starts from 1, a zero value is assigned to DH(1), such that the differential histogram DH has the same length (e.g., same number of histogram bins) as the histogram H, and there is a one-to-one correspondence between the histogram bins of the histogram H and the histogram bins (also referred to as bins) of the differential histogram DH. The value DH(i) of the i-th bin of the differential histogram DH is an approximation of (e.g., proportional to) the gradient of the i-th bin of the histogram H, and therefore, is used as the gradient of the i-th bin of the histogram H in the discussed herein.

In some embodiments, to find the first rising edge in the pre-determined region of the histogram H, the maximum value MaxVal of the differential histogram DH between bin index Start and bin index Stop is found, and the bin index of the first bin (e.g., leftmost bin) of the differential histogram DH in the pre-determined region and having the maximum value MaxVal is used as the location of the first rising edge.

In other embodiments, the location of the first rising edge is determined by finding the first bin (e.g., leftmost bin) in the pre-determined region of the histogram H that has a gradient (as indicated by the value of the corresponding bin of the differential histogram DH) larger than a pre-determined threshold TH, which threshold TH is determined by an ambient noise level and a user-defined confidence level (e.g., a user-defined scale factor). For example, to find the location of the first rising edge, the values of the bins of the differential histogram DH in the first pulse region (e.g., with bin indices between Start and Stop) are compared with the threshold TH, and the first bin (e.g., leftmost bin) in the first pulse region of the histogram H having a gradient value larger than the threshold TH is identified. The bin index of the identified first bin is used to indicate the location (or equivalently, the distance) of the first rising edge in the first pulse region of the histogram.

As an example, the threshold TH may be determined as described below. Denote the ambient events (e.g., avalanche current events caused by ambient light signal) per histogram bin as $\sigma^2$, and denote the user-defined confidence level as C, then the threshold TH is calculated as $TH = C \times \sqrt{2 \times \sigma^2}$. Note that in the above calculation, the ambient events per bin of the differential histogram is considered as twice of the ambient noise events per bin of the histogram (due to the subtraction operation used for calculating the differential histogram doubling the power of the ambient events level). The noise in each differential histogram bin is then the square root of twice the ambient events per bin of the histogram due to the shot noise characteristics of light. The ambient noise events per histogram bin may be measured beforehand using a calibration process, or may be measured periodically during operation of the ToF ranging system. The user-defined confidence level C may be adjusted in accordance with the ambient noise level to achieve reliable detection of the first rising edge. For example, the user-defined confidence level C may be increased if the ambient noise level increases, or vice versa, in order to avoid false detection of the first rising edge and to achieve a target detection rate for the first rising edge. Besides the method discussed above, other suitable methods for determining the threshold TH are also possible, and are fully intended to be included within the scope of the present disclosure.

Figure 4:
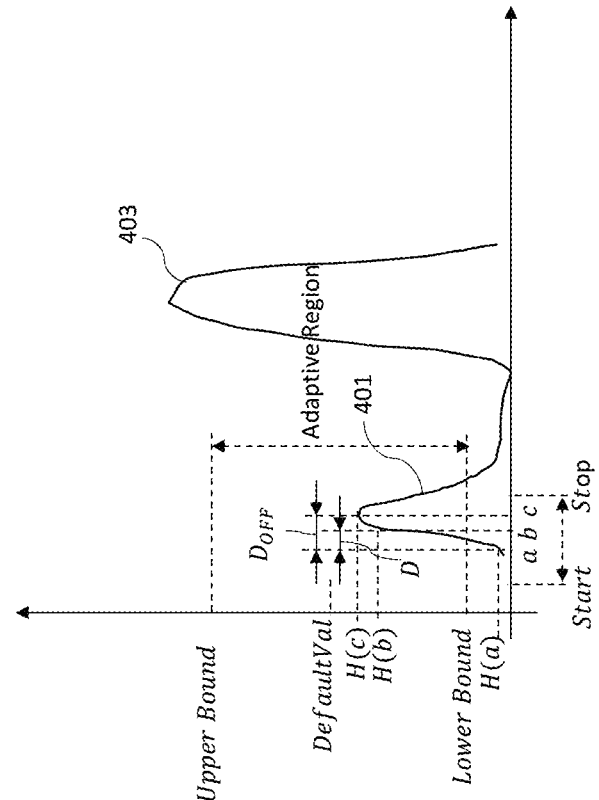
FIG. 4 illustrates a histogram being processed by the cross-talk cancellation method of FIG. 3, in an embodiment.

FIG. 4 illustrates a histogram having a pulse region 401 and a pulse region 403. The pulse region 401 corresponds to the cross-talk signal, and the pulse region 403 corresponds to reflected light signal from a target. Note that in FIG. 4, the histogram is illustrated as a curve instead of bars, which curve is the envelope of the histogram bins, as skilled artisans readily appreciate. In addition, in the histograms of FIG. 4, only the portions of the histogram containing the pulses (also referred to as received pulse regions, or pulse regions) corresponding to reflection from the cover glass and the target are shown, and other portions of the histogram, such as portions containing random noise (e.g., shot noise) may not be plotted for simplicity.

In the example of FIG. 4, the pre-determined region is a portion of the histogram between bin indices Start and Stop, which covers the region where the rising edge of the pulse region 401 and the reference zero-point histogram bin are located. The location of the first rising edge is found to be in a histogram bin with bin index a, using, e.g., the maximum gradient criteria or the threshold TH criteria discussed above.

Referring back to FIG. 3, at block 303, the histogram value H(b) at bin index b (e.g., b=a+D) is obtained. In some embodiments, the bin index b is behind the bin index a by a pre-determined number D. In some embodiments, the pre-determined number D is between about 50% and about 100% of a pre-determined offset $D_{OFF}$ (e.g., $0.5 \times D_{OFF} < D < D_{OFF}$), such as 75% of the pre-determined offset $D_{OFF}$. In an example embodiment, the pre-determined offset $D_{OFF}$ is half of a light pulse width (measured in unit of distance), where the light pulse is the light pulse transmitted by the light source 103 of the ToF ranging system 100. For example, denote the duration of the transmitted light pulse as $T_P$, and the speed of light as C, then $D_{OFF} = 0.5 \times T_P \times C$ when measured in meters, or $D_{OFF} = 0.5 \times T_P \times C / D_{BIN}$ when measured in number of histogram bins. In the example of FIG. 4, the histogram bin with bin index $a+D_{OFF}$ corresponds to the center of the pulse region 401, and has the maximum value (also referred to as a peak value) of the pulse region 401 (e.g., the cross-talk signal).

Note that the pre-determined offset $D_{OFF}$ is determined by the shape of the transmitted light pulse produced by the light source 103 (e.g., a VCSEL device), which shape can be characterized (e.g., measured) beforehand, e.g., by a calibration process of the light source 103. In some embodiments, the pre-determined offset $D_{OFF}$ is determined beforehand, saved, and used later, e.g., for determining the pre-determined number D, and/or for calculating the distance of the target. Note that since the pre-determined offset $D_{OFF}$ is independent of the various factors that distorts the shape of the received pulse region in the histogram, the estimates of the pre-determined number D and the distance of the target, which are based on the pre-determined offset $D_{OFF}$, are robust and immune to the distortion in the received pulse shape.

The histogram value H(b) at bin index b is used in subsequent processing to calculate a ratio R between the cross-talk signal (e.g., the pulse region 401) and a pre-stored light pulse shape. In some embodiments, the pre-stored light pulse shape (see, e.g., FIG. 5) is a histogram of the transmitted light pulse obtained during a calibration process, e.g., when the transmitted light pulse is reflected by a single target with little or no ambient noise. In other words, the pre-stored light pulse shape represents an ideal histogram of the transmitted light pulse, and closely resembles the shape of the transmitted light pulse. In the illustrated embodiment, the pre-stored light pulse shape is a normalized histogram of the transmitted light pulse, such that the maximum value of the pre-stored light pulse shape is a unit value of one. The pre-stored light pulse shape may be stored in a memory region of the ToF ranging system (see, e.g., 1015 in FIG. 9).

The cross-talk signal (e.g., pulse region 401) in the histogram may ideally be a scaled version of the pre-stored light pulse shape. Therefore, by finding the ratio R between, e.g., the maximum value of the cross-talk signal and the maximum value of the pre-stored light pulse shape, the pre-stored light pulse shape can be scaled by (e.g., multiplied by) the ratio R, then subtracted from the histogram to generate a cross-talk free (or substantially cross-talk free) histogram.

However, during operation of the ToF ranging system, the cross-talk signal in the histogram may be distorted by various factors, such as by a target located at a close distance (e.g., a few millimeters) to the cover glass. Such a close target generates a pulse region in the histogram, which pulse region may merge with the pulse region caused by the cover glass, thereby distorting the pulse region (e.g., 401) containing the cross-talk signal. If the maximum value of the pulse region 401 is used to calculate the ratio R, the close target may inflate the maximum value of the pulse region and leads to an erroneously large ratio R. The disclosed method 300, by using the histogram value H(b) at bin index b, which bin index b=a+D is closer to the first rising edge than the location $a+D_{OFF}$, reduces the chance that a close target interferes with the estimate of the ratio R. This is because the reflected light signal from the close target arrives at the SPAD array later than the reflected light signal from the cover glass, and therefore, the pulse region corresponding to the close target does not distort the beginning portion (referred to as the rising edge region) of the pulse region corresponding to the cover glass. In other words, the rising edge region of the pulse region (e.g., 401) corresponding to the cover glass is not distorted by the close target, and can be used to provide a reliable estimate of the ratio R. More details are disclosed hereinafter.

Referring to FIG. 4, the first rising edge of the pulse region 401 is at bin index a. The value of the histogram bin at bin index b is H(b). To obtain an estimate of the maximum value PeakEst of the cross-talk signal at bin index c=a+ $D_{OFF}$, the value H(b) is scaled by a pre-determined value S. In other words, PeakEst=S×H(b). The pre-determined value S can be determined from the known shape of the emitted light pulse. Details are discussed below with reference to FIG. 5.

Figure 5:
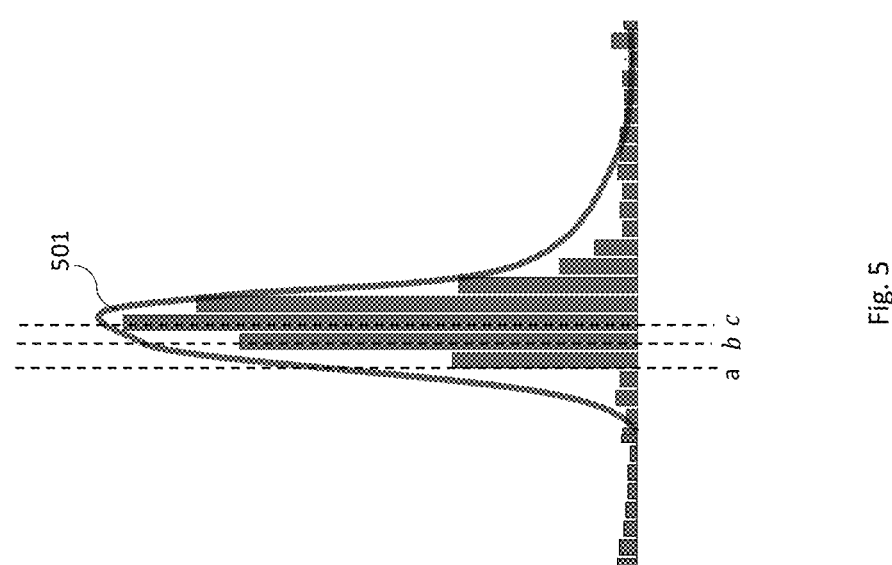
FIG. 5 illustrates a pre-stored light pulse, in an embodiment.

FIG. 5 illustrates the pre-stored light pulse shape (e.g., a bar-shaped histogram), which is a histogram of the emitted light pulse obtained, e.g., during a calibration process, in an embodiment. The bar-shaped histogram closely resembles the shape of the emitted light pulse by the light source 103 of the ToF ranging system. The pre-stored light pulse shape has the same timing resolution (e.g., bin time width) as the histogram generated by the ToF ranging system 100 during normal operation, and corresponds to histogram bins around the reference zero-point histogram bin (e.g., bins between bin indices 1 and M+K, where M is the bin index of the reference zero-point histogram bin, and K is a positive number such as 4, 5, or more), in some embodiments. The pre-stored light pulse shape may be analyzed following the same processing as discussed above to find the location a of the first rising edge in the pre-stored light pulse shape. The pre-determined value S may be determined by computing the ratio between the values of the pre-stored light pulse shape at bin indices c (e.g., c=a+$D_{OFF}$) and b (e.g., b=a+D). In other words, S=PH(c)/PH(b), where PH(c) and PH(b) denote the values of the pre-stored light pulse shape at bin indices c and b, respectively. The pre-determined value S is pre-computed and saved for use later, in some embodiments.

As discussed above, the maximum value of the cross-talk signal may be estimated by PeakEst=S×H(b). Since the maximum value of the pre-stored light pulse shape (which is a normalized histogram) is 1, the ratio R between the cross-talk signal in the histogram and the pre-stored light pulse shape may therefore be computed as R=PeakEst=S× H(b). The pre-stored light pulse shape can then be scaled by the ratio R, and next, the scaled pre-stored light pulse shape is subtracted from the histogram to generate a cleaner histogram with little or no cross-talk signal.

In the example of FIG. 4, the pulse region 401 corresponding to the cross-talk signal is separate from the pulse region 403, and retains the shape of the emitted light pulse. However, during operation of the ToF ranging system 100, various factors may distort the pulse region 401. For example, random noise, the number of targets, the relative location of the targets, and the receiver bandwidth (e.g., the bandwidth of the SPAD array) may introduce serious distortions in the received pulse regions, and may cause error in the computed ratio R, or may even cause the processing discussed above to fail to detect the first rising edge. To handle the various corner cases and prevent over-correction or under-correction, additional boundary checking and processing are incorporated into the method 300, details are discussed below.

Referring back to FIG. 3, at block 305, the histogram bin value H(b) is compared with the histogram bin value H(a). If H(b)>H(a), which is the expected case, the processing goes to block 307. However, if H(b)≤H(a), this may indicate that the pulse region 401 is severely distorted, and the histogram bin value H(b) is not suitable for use to compute the ratio R, and the processing goes to block 309.

At block 307, the histogram bin value H(b) is compared with an upper bound UB, where the upper bound UB is a maximum allowed value for the histogram bin value H(b). If H(b)>UB, this may indicate that the value H(b) is unreliable and may be, e.g., inflated by a close target, and therefore, should not be used to compute the estimate maximum value PeakEst of the cross-talk signal. Therefore, the processing goes to block 317, where the estimated maximum value PeakEst is assigned a default value Default-Val. If, however, H(b) is not larger than the upper bound UB, the processing goes to block 311, where the estimated maximum value PeakEst is computed as PeakEst=S×H(b), where S=PH(c)/PH(b) as discussed above.

Next, following the processing at block 311, the estimated maximum value PeakEst obtained in block 311 is compared with a lower bound LB at block 315, where the lower bound LB is a minimum allowed value for the estimated maximum value PeaskEst. If the estimated maximum value PeakEst is smaller than the lower bound LB, this may indicate an error in the processing (e.g., the first rising edge was chosen at a wrong location due to random noise), and therefore, the processing goes to block 317, where the estimated maximum value PeakEst is assigned the default value DefaultVal.

If the estimated maximum value PeakEst is not smaller than the lower bound LB, there is no change to the estimated maximum value PeakEst, and the processing goes to block 319, where the estimated maximum value PeakEst (which is the same as the ratio R due to the pre-stored light pulse shape being a normalized histogram) is used to scale the pre-stored light pulse shape, and the scaled pre-stored light pulse shape is subtracted from the histogram H to obtain a clean histogram with reduced cross-talk signal.

If, in block 305, the value H(b) is not larger than the value H(a), the processing goes to block 309, where the value H(a) is compared with the upper bound UB. If H(a) is larger than the upper bound UB, this may indicate an error, and the processing goes to block 317, where the estimated maximum value PeakEst is assigned the default value DefaultVal. If H(a) is not larger than the upper bound UB, the processing goes to block 313, where the estimated maximum value PeakEst is computed as PeakEst=L×S×H(a), where S=PH(c)/PH(b) as discussed above, and L is a scaling factor larger than 1, such as 2. Next, the processing goes to block 315, wherein the estimated maximum value PeakEst is compared with the lower bound LB. The subsequent processing in blocks 317 and 319 are already discussed before, thus details are not repeated.

In some embodiments, the upper bound UB and the lower bound LB may be determined through, e.g., calibration, simulation, combinations thereof, or the like. In some embodiments, the upper bound UB and the lower bound LB are programmable values, and are set with initial values obtained through a calibration process. During the lifetime of the ToF ranging system 100, the upper bound UB and the lower bound LB may be updated, e.g., based on aggregated data regarding past performance, and therefore, may be modified to improve the performance of the ToF ranging system 100.

The upper bound UB and the lower bound LB avoid over-correction and under-correction of the cross-talk signal. The default value DefaultVal for the estimated maximum value PeakEst allows for a reasonable amount of cancellation of the cross-talk signal in the histogram, even when the method fails to find a correct location of the rising edge due to, e.g., excessive distortion of the pulse region 401 or large noise. FIG. 4 shows examples for the upper bound UB, the lower bound LB, and the default value DefaultVal.

In some embodiments, after the cross-talk cancellation, the rising edge detection method discussed above is used to estimate the distance of a target in each pulse region of the histogram. Note that each pulse region in the histogram may include one target, or may include more than one closely-spaced targets (referred to as a cluster of targets in the pulse region), in which case the reflection light signals from the cluster of targets merge together to form one long, distorted pulse region (e.g., distorted compared with the emitted light pulse). However, as discussed above, the location and the shape of the first rising edge (e.g., the leftmost rising edge) of each pulse region is generally not distorted, and can be used to reliably estimate the distance of the first target (e.g., the closest target) contained in that pulse region.

In an embodiment, after the cross-talk cancellation is performed for the histogram, for each pulse region of the histogram, a first rising edge (e.g., a leftmost rising edge) is found by, e.g., finding the first histogram bin (e.g., the leftmost histogram bin) having a gradient that is larger than a threshold TH, or is a maximum gradient in that pulse region. Note for target detection, the confidence level C used in the calculation of the threshold TH (e.g., $TH=C\times\sqrt{2\times\sigma^2}$)

is different from that used for cross-talk cancellation. Once the location (e.g., bin index) of the first rising edge in each pulse region is found, a distance of a first target (e.g., the closest target) in that pulse region can be obtained by adding the pre-determined offset $D_{OFF}$ to the distance of the first rising edge. Additional details and additional methods of rising edge-based target detection and estimation are discussed in U.S. patent application Ser. No. 18/342,965, which is incorporated herein by reference. Any suitable method disclosed in U.S. patent application Ser. No. 18/342,965 may be used here for target detection and estimation.

Figure 6A:
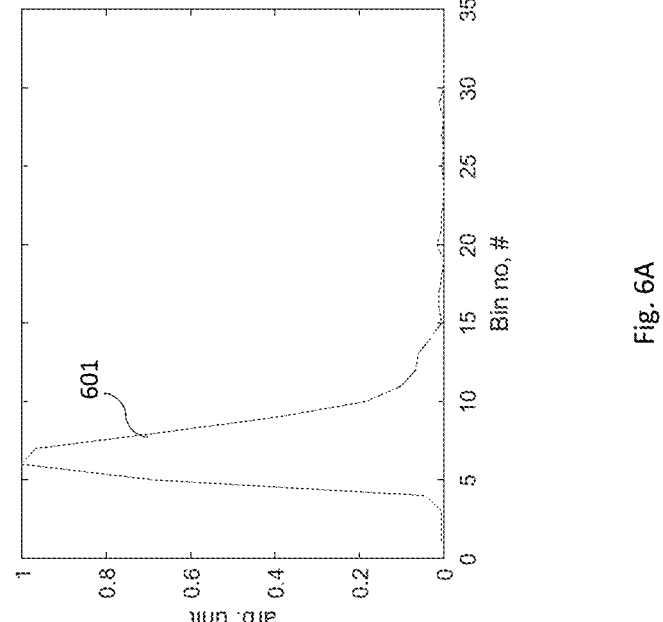
FIGS. 6A-6C illustrate the performance of the cross-talk cancellation method of FIG. 3, in an embodiment.
Figure 6C:
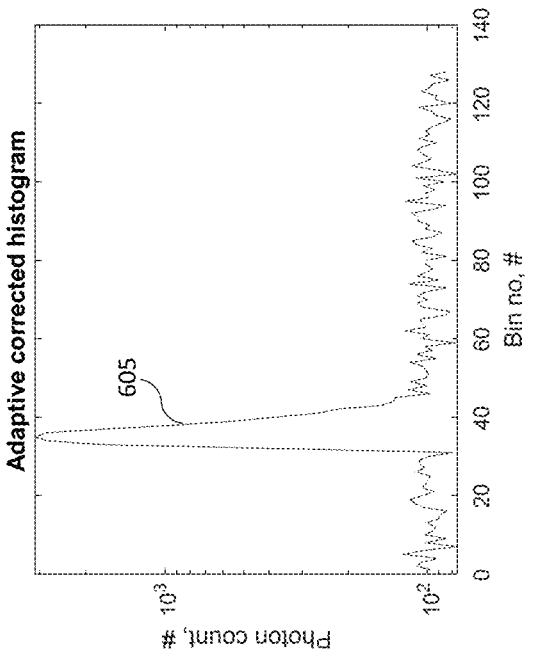
Figure 6B:
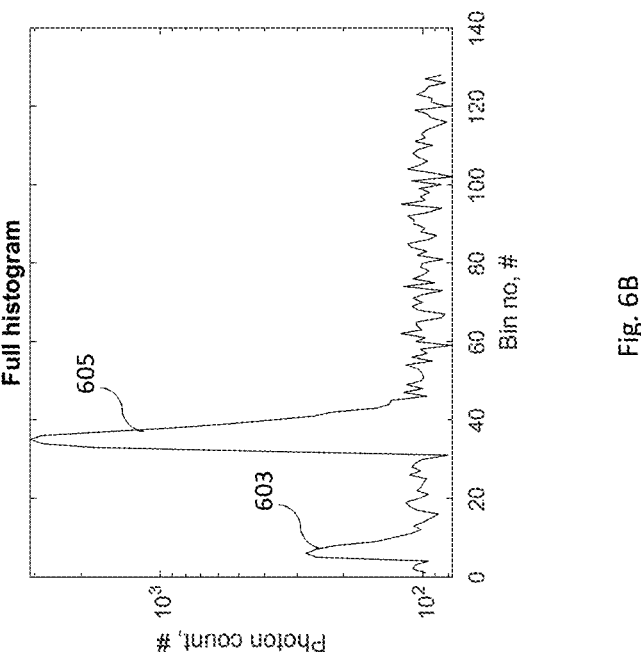

FIGS. 6A-6C illustrate the performance of the cross-talk cancellation method of FIG. 3, in an embodiment. In FIG. 6A, the curve 601 shows a pre-stored light pulse shape (e.g., a normalized histogram with a maximum amplitude of 1). FIG. 6B shows a histogram with two pulse regions 603 and 605. In the example of FIG. 6B, the pulse region 603 corresponds to the cross-talk signal, and the pulse region 605 corresponds to a target. The pulse regions 603 and 605 are separated (e.g., not merged). FIG. 6C shows the histogram after the cross-talk signal cancellation using the method of FIG. 3. As illustrated in FIG. 6C, the pulse region 603 in FIG. 6B is removed, and the histogram after cross-talk cancellation only includes the pulse region 605.

Figure 7B:
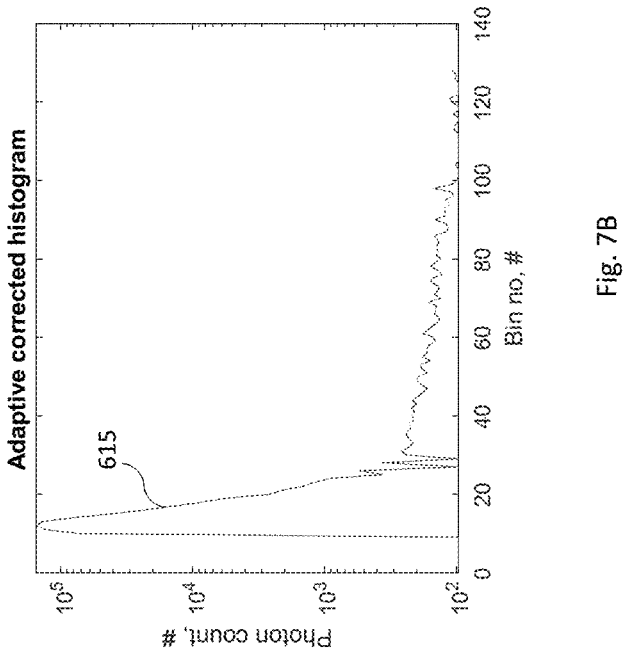
FIGS. 7A-7B illustrate the performance of the cross-talk cancellation method of FIG. 3, in another embodiment.
Figure 7A:
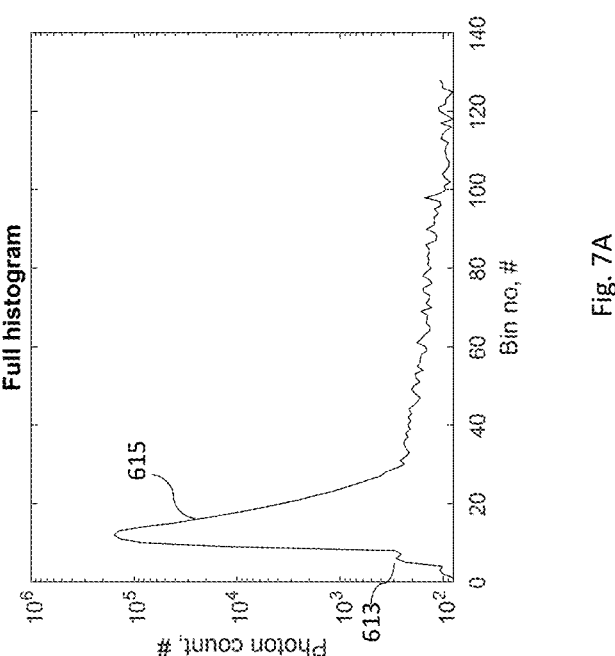

FIGS. 7A-7B illustrate the performance of the cross-talk cancellation method of FIG. 3, in another embodiment. FIG. 7A shows a histogram with a pulse region 613 and a pulse region 615. The pulse region 613 corresponds to the cross-talk signal, and the pulse region 615 corresponds to a target. The target is very close to the cover glass, such that the pulse region 615 overlaps (e.g., merges) with the pulse region 613. The pre-stored pulse shape for the example of FIGS. 7A-7B is the same as FIG. 6A, thus not shown again. FIG. 7B shows the histogram after the cross-talk cancellation using the method of FIG. 3. As illustrated in FIG. 7B, the cross-talk signal is removed from the histogram. Due to the overlapping of the cross-talk signal 613 and the pulse region 615, the removal of the cross-talk signal generated some distortions (e.g., some notches) around bin index 30. However, for the purpose of target detection and target distance estimation, those distortions do not cause performance degradation.

Figure 8:
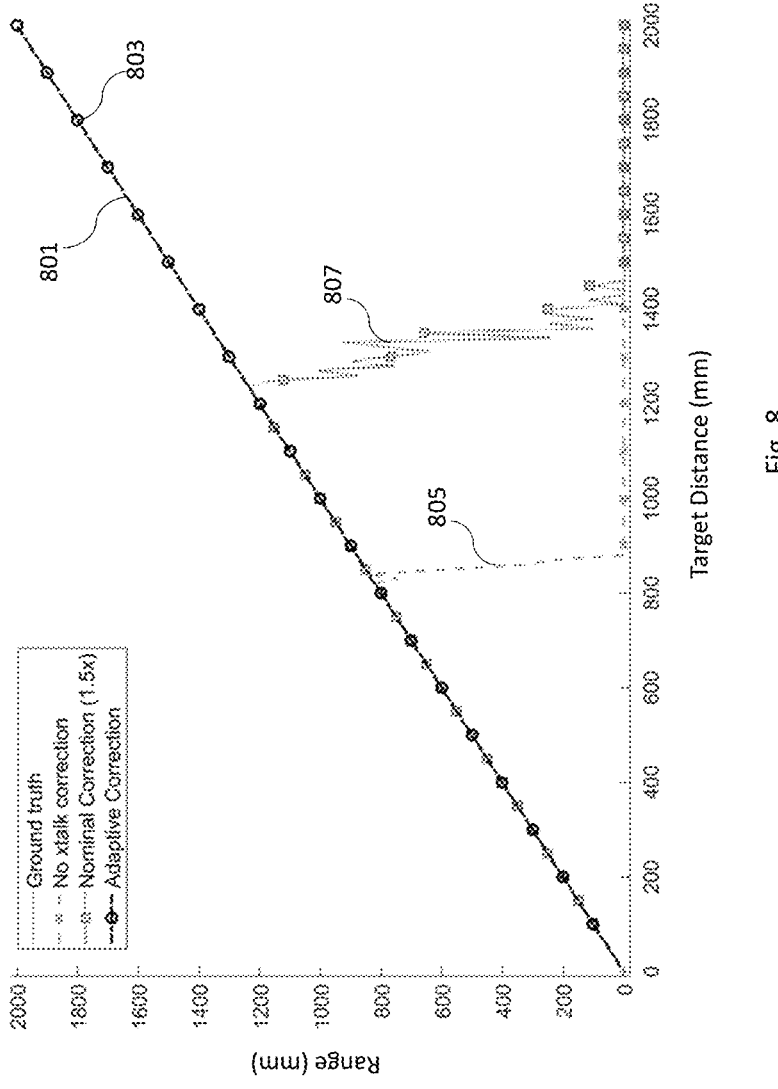
FIG. 8 illustrates the performance of a ToF ranging system using the cross-talk cancellation method of FIG. 3, in an embodiment.

FIG. 8 illustrates the performance of a ToF ranging system using the cross-talk cancellation method of FIG. 3, in an embodiment. In FIG. 8, the x-axis represents the target distance, and y-axis represents the reported distance of the target by the ToF ranging system. The histogram is processed by the cross-talk cancellation method of FIG. 3, then the cleaner histogram (e.g., after cross-talk cancellation) is used to estimate the distance of the target using the rising edge based target detection and estimation method discussed above. In FIG. 8, the dashed line 801 with a 45-degree angle represents the idea performance (y=x). The curve 803 represents the performance of the ToF ranging system using the cross-talk cancellation method of FIG. 3. For comparison purpose, the performance of two other ToF ranging systems are illustrated. In particular, the curve 805 represents the ranging results of a ToF ranging system without using any cross-talk cancellation, and the curve 807 represents the ranging results of a ToF ranging system using a fixed cross-talk cancellation scheme (e.g., using a fixed scaling factor for the pre-stored light pulse shape).

As illustrated in FIG. 8, by adaptively estimating the scaling factor (e.g., ratio R) for the pre-stored light pulse shape, the ToF ranging system using the cross-talk cancellation method of FIG. 3 achieves the same performance as the ideal performance indicated by the dashed line 801. In contrast, the curve 805 and 807 show that the respective ToF ranging system without the presently disclosed method failed at long distances. This may be due to the low target signal level at long distance, which causes the ToF ranging system to erroneously identify the cross-talk signal as the target.

Figure 9:
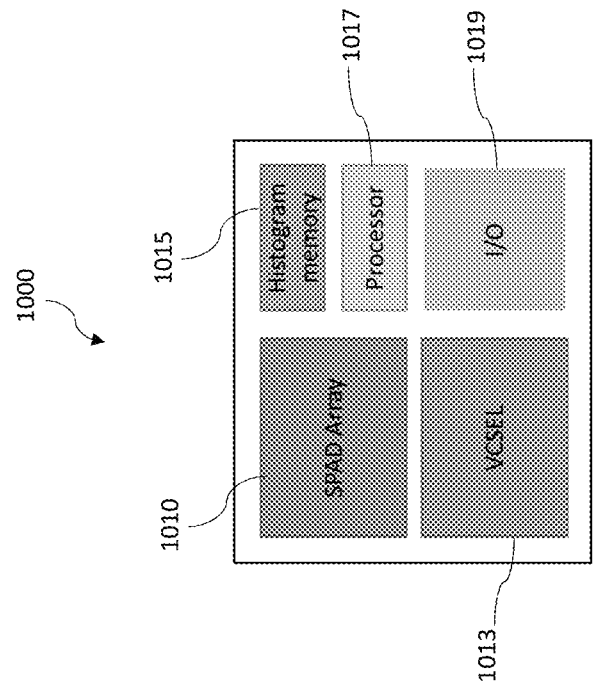
FIG. 9 illustrates an integrated circuit (IC) device formed as a ToF ranging system, in an embodiment.

FIG. 9 illustrates an integrated circuit (IC) device 1000 formed as a ToF ranging system, in an embodiment. The IC device 1000 may be formed as the ToF ranging system 100 of FIG. 1. Note that for simplicity, not all features of the IC device 1000 are illustrated. The IC device 1000 includes a light source 1013 (e.g., a VCSEL, an LED, or the like) and a SPAD array 1010. The light source 1013 may correspond to the light source 103 in FIG. 1. The SPAD array 1010 may correspond to the SPAD array 101 and the reference SPAD array 101R in FIG. 1, and may additionally include the ToF histogram generation circuit 107A of FIG. 1.

The IC device 1000 further includes a memory module 1015 for storing the histogram generated by the SPAD array 1010. The memory module 1015 may also store the pre-stored light pulse shape and the high-resolution pulse shape (see, e.g., FIG. 5), the pre-determined value S, and so on. Notably in FIG. 9, a processor 1017 is integrated in the IC device 1000, which processor 1017 may correspond to the processor 107B in FIG. 1 and may be configured to perform one or more of the methods disclosed herein to perform cross-talk cancellation and to generate an estimate of the distance of a target in a pulse region. The IC device 1000 may further include an input/output (I/O) module 1019 for communication with other devices.

Note that the various disclosed methods for target distance estimation are simple to implement, and require very little computational power. These advantages allow many different types of processors to be easily and economically integrated into the IC device 1000 as the processor 1017, and no off-chip processing of the histogram by another processor is needed. The on-chip processing of the histogram data significantly reduces the chip complexity related to I/O transfer of histogram data to an off-chip processing module, and reduces the processing delay related to off-chip processing Variations and modifications to the disclosed method are possible and are fully intended to be included within the scope of the present disclosure. For example, after finding the location of the first rising edge in the pre-determined region in block 301 of FIG. 3 and before the processing in block 303, the location of the first rising edge may be fine-tuned by adding an adjustment term $D_{ADJ}$ to the location of the first rising edge. Different methods for computing the adjustment term $D_{ADJ}$ are possible. Two different embodiment methods for determining the adjustment term $D_{ADJ}$ are discussed below.

In an embodiment, the adjustment term $D_{ADJ}$ is calculated using the value of the bin of the differential histogram DH at the location of the first rising edge found in block 301, and using values of the bins of the histogram H around the location of the first rising edge. For example, assuming that from block 301, it is determined that the location of the first rising edge is in the m-th bin of the histogram, then the adjustment term $D_{ADJ}$ is calculated as $D_{ADJ}=DH(m)/(H(m)+H(m+1))$. The adjustment term $D_{ADJ}$ is calculated by dividing DH(m) by the sum of H(m) and H(m+1). In other words, the adjustment term $D_{ADJ}$ takes into consideration of the shape of the histogram around the first rising edge, and therefore, is able to provide a fine adjustment in distance that is smaller than the bin width $D_{BIN}$, thus improving the accuracy of the estimate of the location (e.g., distance) of the first rising edge.

In another embodiment, the location of the first rising edge is fine-tuned by performing a fitting process between first rising edge and a pre-stored high-resolution rising edge. The edge fitting process is described in U.S. patent application Ser. No. 18/342,965, details are not repeated here. The fitting process provides sub-bin adjustment to the location of the first rising edge.

Note that the adjustment term $D_{ADJ}$ may be a fractional value, and the bin index b in block 303 should be changed to $b=a+D+D_{ADJ}$ to incorporate the fine-tuning. In order to obtain the histogram value of H(b) for a fractional index number b, an interpolation process (e.g., a liner interpolation or other interpolation method) may be performed for the histogram H to generate the histogram value at a location between integer histogram bin numbers. In addition, in order to compute the pre-determined value S (e.g., S=PH(c)/PH(b)) for fractional bin numbers, a high-resolution histogram of the emitted light pulse may be used, as discussed below with reference to FIG. 5.

Referring to FIG. 5, the curve 501 in FIG. 5 is the envelope of a high-resolution histogram of the emitted light pulse, where the sampling rate of the high-resolution histogram is higher (e.g., 10 times, 100 times, or more) than that of the bar-shaped histogram in FIG. 5, where the bar-shaped histogram is generated at the sampling rate used during normal operation of the ToF ranging system. The high-resolution histogram indicated by the curve 501 may be obtained in a calibration process with a high sampling rate. The ratio between the high sampling rate of the high-resolution histogram and that of the bar-shaped histogram is referred to as an over-sampling factor OV. The high-resolution histogram provides sub-bin resolution compared with the bar-shaped histogram of FIG. 5, and values of the high-resolution histogram may be used to provide values of the histogram at bins with fractional bin numbers, e.g., by dividing the bin numbers of the high-resolution histogram by the overs-sampling factor OV and finding the closest number to the fractional bin number). FIG. 5 illustrates example bin indices b and c that are fractional numbers, the high-resolution histogram indicated by the curve 501 can provide histogram values at those fractional bin indices to compute the pre-determined value S.

FIG. 10 illustrates a method 1100 of operating a ToF ranging system, in an embodiment. It should be understood that the embodiment method shown in FIG. 10 is merely an example of many possible embodiment methods. One of ordinary skill in the art would recognize many variations, alternatives, and modifications. For example, various steps as illustrated in FIG. 10 may be added, removed, replaced, rearranged, or repeated.

Referring to FIG. 10, at block 1010, a histogram generated by a ToF imager of the ToF ranging system is received, wherein the histogram comprises a cross-talk signal corresponding to reflected light pulses from a cover glass of the ToF ranging system. At block 1020, a first rising edge having a first gradient is found in a first region of the histogram, wherein the first gradient is larger than a first threshold or is a maximum gradient in the first region, wherein the first rising edge is in a first histogram bin having a first value. At block 1030, a second value of a second histogram bin in the first region is determined, wherein the first histogram bin precedes the second histogram bin by a pre-determined distance. At block 1040, a ratio between the first region of the histogram and a pre-stored light pulse shape is estimated based on the first value and the second value. At block 1050, the pre-stored light pulse shape is scaled with the estimated ratio. At block 1060, the scaled pre-stored light pulse shape is subtracted from the histogram.

Disclosed embodiments may achieve advantages. For example, the disclosed methods provide ways to adaptively cancel (e.g., remove) cross-talk signal from the histogram. By estimating the ratio R dynamically using the histogram, an appropriate amount of cross-talk signal is removed from the histogram. The disclosed method automatically adjusts the amount of cross-talk signal to be removed based on the current condition of the cover glass (e.g., scratch, smudge, dirt). In addition, the disclose method also corrects for variations in cover glass quality, variations in cover glass thickness, air gap variations, and so on, thus achieving excellent cross-talk cancellation without over-correction. The upper bound and lower bound introduced in the method 300 help to prevent both over-correction and under-correction, and the default value introduced ensures that at least a reasonable amount of cross-talk signal is removed, even when the distortions in the histogram cause the method 300 to fail to find the correct location of the first rising edge. The disclosed methods are simple to implement and saves computational power, and as a result, allows a fully integrated ToF ranging system on a single IC device.

Example embodiments of the present invention are summarized here. Other embodiments can also be understood from the entirety of the specification and the claims filed herein.

Example 1. In an embodiment, a method of operating a time-of-flight (ToF) ranging system includes: receiving a histogram generated by a ToF imager of the ToF ranging system, wherein the histogram comprises a cross-talk signal corresponding to reflected light pulses from a cover glass of the ToF ranging system; finding, in a first region of the histogram, a first rising edge having a first gradient, wherein the first gradient is larger than a first threshold or is a maximum gradient in the first region, wherein the first rising edge is in a first histogram bin having a first value; determining a second value of a second histogram bin in the first region, wherein the first histogram bin precedes the second histogram bin by a pre-determined distance; estimating a ratio between the first region of the histogram and a pre-stored light pulse shape based on the first value and the second value; scaling the pre-stored light pulse shape with the estimated ratio; and subtracting the scaled pre-stored light pulse shape from the histogram.

Example 2. The method of Example 1, further comprising, after the subtracting, detecting a target in the histogram by: finding, in a second region of the histogram, a second rising edge having a second gradient, wherein the second gradient is larger than a second threshold different from the first threshold, or is a maximum gradient in the second region; and computing an estimate of a distance of the target by adding a per-determined offset to a distance of the second rising edge.

Example 3. The method of Example 1, further comprising, before finding the first rising edge: computing differences between adjacent histogram bins in the first region; and assigning the computed differences as gradients of corresponding histogram bins in the first region.

Example 4. The method of Example 1, wherein the first region comprises a plurality of histogram bins around a reference zero-point histogram bin, wherein a distance of the reference zero-point histogram bin corresponds to a distance between an emitter of the ToF ranging system and the cover glass of the ToF ranging system.

Example 5. The method of Example 1, wherein estimating the ratio comprises: comparing the second value with the first value; and in response to determining that the second value is larger than the first value: checking if the second value is between an upper bound and a lower bound; and in response to determining that the second value is between the upper bound and the lower bound, generating the estimate of the ratio by multiplying the second value with a first pre-determined scaling factor.

Example 6. The method of Example 5, further comprising, in response to determining that the second value is above the upper bound or below the lower bound, assigning a pre-determined default value as the estimate of the ratio.

Example 7. The method of Example 6, wherein estimating the ratio further comprises: in response to determining that the second value is smaller than the first value: checking if the first value is between the upper bound and the lower bound; and in response to determining that the first value is between the upper bound and the lower bound, generating the estimate of the ratio by multiplying the first value with a second pre-determined scaling factor.

Example 8. The method of Example 7, further comprising, in response to determining that the first value is above the upper bound or below the lower bound, assigning the pre-determined default value as the estimate of the ratio.

Example 9. The method of Example 1, further comprising, after finding the first rising edge and before determining the second value: fine-tuning a location of the first rising edge by computing an adjustment term and adding the adjustment term to the location of the first rising edge.

Example 10. The method of Example 9, wherein the adjustment term is a fractional number, wherein determining the second value of the second histogram bin comprises: performing an interpolation process using values of the histogram bins around the second histogram bin to generate an interpolated histogram value; and assigning the interpolated histogram value as the second value.

Example 11. In an embodiment, a method of operating a time-of-flight (ToF) ranging system includes: generating, by a ToF sensor of the ToF ranging system, a histogram, wherein the histogram comprises a cross-talk signal generated by a reflected light signal from a cover glass of the ToF ranging system; and removing the cross-talk signal from the histogram, comprising: estimating gradients of histogram bins in a first region of the histogram by computing differences between adjacent histogram bins; finding, in a first histogram bin in the first region of the histogram, a first rising edge, wherein the first histogram bin has a first value, and a gradient of the first histogram bin is larger than a threshold or is a maximum gradient in the first region; determining a second value of a second histogram bin in the first region, wherein the second histogram bin is behind the first histogram bin by a pre-determined number; computing a scaling factor for a pre-stored pulse shape based on the first value and the second value; scaling the pre-stored pulse shape with the scaling factor; and subtracting the scaled pre-stored pulse shape from the histogram.

Example 12. The method of Example 11, wherein the first region comprises a plurality of histogram bins around a reference zero-point histogram bin, wherein a distance of the reference zero-point histogram bin corresponds to a distance between a ToF emitter of the ToF ranging system and the cover glass.

Example 13. The method of Example 11, wherein the ToF sensor is configured to emit a light signal comprising light pulses, wherein the pre-stored pulse shape corresponds to a normalized histogram of the light pulses emitted by the ToF sensor.

Example 14. The method of Example 13, wherein the scaling factor is a ratio between a third value in a third histogram bin in the first region of the histogram and a corresponding fourth value of the normalized histogram.

Example 15. The method of Example 11, wherein computing the scaling factor comprises: determine if the second value is larger than the first value; and in response to determining that the second value is larger than the first value: checking if the second value is between an upper bound and a lower bound; and in response to determining that the second value is between the upper bound and the lower bound, computing the scaling factor by multiplying the second value with a pre-determined value.

Example 16. The method of Example 15, further comprising, in response to determining that the second value is outside of a range between the upper bound and the lower bound, assigning a default value as the scaling factor.

Example 17. In an embodiment, a time-of-flight (ToF) ranging system includes: a ToF sensor configured to emitted light pulses and to generate a histogram based on reflected light pulses; and a processor coupled to the ToF sensor, wherein the processor is configured to: find, in a first region of the histogram, a rising edge having a gradient, wherein the gradient is larger than a threshold or is a maximum gradient in the first region, wherein the rising edge is in a first histogram bin having a first value; determine a second value of a second histogram bin in the first region, wherein the first histogram bin precedes the second histogram bin by a pre-determined number; estimate, based on the first value and the second value, a ratio between the first region of the histogram and a pre-stored light pulse shape; scale the pre-stored light pulse shape with the estimated ratio; and subtract the scaled pre-stored light pulse shape from the histogram.

Example 18. The ToF ranging system of Example 17, wherein the first region includes a plurality of histogram bins around a reference zero-point histogram bin, wherein a distance of the reference zero-point histogram bin corresponds to a distance between a ToF emitter of the ToF ranging system and a cover glass of the ToF ranging system.

Example 19. The ToF ranging system of Example 18, wherein the pre-stored light pulse shape is a normalized histogram of light pulses emitted by the ToF sensor.

Example 20. The ToF ranging system of Example 19, wherein the processor is further configured to: after the subtracting, estimate a distance of a target of the ToF ranging system using the histogram.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a time-of-flight (ToF) ranging system, the method comprising:

receiving a histogram generated by a ToF imager of the ToF ranging system, wherein the histogram comprises a cross-talk signal and a reflected light signal from a target, wherein the cross-talk signal corresponds to an interference in the histogram due to reflected light pulses from a cover glass of the ToF ranging system;

finding, in a first region of the histogram, a first rising edge having a first gradient, wherein the first gradient is larger than a first threshold or is a maximum gradient in the first region, wherein the first rising edge is in a first histogram bin having a first value;

determining a second value of a second histogram bin in the first region, wherein the first histogram bin precedes the second histogram bin by a pre-determined distance;

estimating a ratio between the first region of the histogram and a pre-stored light pulse shape based on the first value and the second value, comprising:

comparing the second value with the first value; and in response to determining that the second value is larger than the first value:

checking if the second value is between an upper bound and a lower bound; and in response to determining that the second value is between the upper bound and the lower bound, generating the estimate of the ratio by multiplying the second value with a first pre-determined scaling factor;

scaling the pre-stored light pulse shape with the estimated ratio;

subtracting the scaled pre-stored light pulse shape from the histogram, wherein the subtracting reduces the interference in the histogram due to the reflected light pulses from the cover glass; and after the subtracting, estimating a distance of the target using the histogram.

2. The method of claim 1, wherein estimating the distance of the target comprises:

finding, in a second region of the histogram, a second rising edge having a second gradient, wherein the second gradient is larger than a second threshold different from the first threshold, or is a maximum gradient in the second region; and computing an estimate of the distance of the target by adding a pre-determined offset to a distance of the second rising edge.

3. The method of claim 1, further comprising, before finding the first rising edge:

computing differences between adjacent histogram bins in the first region; and assigning the computed differences as gradients of corresponding histogram bins in the first region.

4. The method of claim 1, wherein the first region comprises a plurality of histogram bins around a reference zero-point histogram bin, wherein a distance of the reference zero-point histogram bin corresponds to a distance between an emitter of the ToF ranging system and the cover glass of the ToF ranging system.

5. The method of claim 1, further comprising, in response to determining that the second value is above the upper bound or below the lower bound, assigning a pre-determined default value as the estimate of the ratio.

6. The method of claim 5, wherein estimating the ratio further comprises:

in response to determining that the second value is smaller than the first value:

checking if the first value is between the upper bound and another lower bound; and in response to determining that the first value is between the upper bound and the another lower bound, generating the estimate of the ratio by multiplying the first value with a second pre-determined scaling factor.

7. The method of claim 6, further comprising, in response to determining that the first value is above the upper bound or below the another lower bound, assigning the pre-determined default value as the estimate of the ratio.

8. The method of claim 1, further comprising, after finding the first rising edge and before determining the second value:

fine-tuning a location of the first rising edge by computing an adjustment term and adding the adjustment term to the location of the first rising edge.

9. The method of claim 8, wherein the adjustment term is a fractional number, wherein determining the second value of the second histogram bin comprises:

performing an interpolation process using values of the histogram bins around the second histogram bin to generate an interpolated histogram value; and assigning the interpolated histogram value as the second value.

10. A method of operating a time-of-flight (ToF) ranging system, the method comprising:

generating, by a ToF sensor of the ToF ranging system, a histogram, wherein the histogram comprises a cross-talk signal and a target signal, wherein the target signal is generated by a reflected light signal from a target of the ToF ranging system, wherein the cross-talk signal is generated by a reflected light signal from a cover glass of the ToF ranging system;

removing the cross-talk signal from the histogram, comprising:

estimating gradients of histogram bins in a first region of the histogram by computing differences between adjacent histogram bins;

finding, in a first histogram bin in the first region of the histogram, a first rising edge, wherein the first histogram bin has a first value, and a gradient of the first histogram bin is larger than a threshold or is a maximum gradient in the first region;

determining a second value of a second histogram bin in the first region, wherein the second histogram bin is behind the first histogram bin by a pre-determined number;

computing a scaling factor for a pre-stored pulse shape based on the first value and the second value, comprising:

determining if the second value is larger than the first value; and in response to determining that the second value is larger than the first value:

checking if the second value is between an upper bound and a lower bound; and in response to determining that the second value is between the upper bound and the lower bound, computing the scaling factor by multiplying the second value with a pre-determined value;

scaling the pre-stored pulse shape with the scaling factor; and subtracting the scaled pre-stored pulse shape from the histogram; and after removing the cross-talk signal, estimating a distance of the target using the histogram.

11. The method of claim 10, wherein the first region comprises a plurality of histogram bins around a reference zero-point histogram bin, wherein a distance of the reference zero-point histogram bin corresponds to a distance between a ToF emitter of the ToF ranging system and the cover glass.

12. The method of claim 10, wherein the ToF sensor is configured to emit a light signal comprising light pulses, wherein the pre-stored pulse shape corresponds to a normalized histogram of the light pulses emitted by the ToF sensor.

13. The method of claim 12, wherein the scaling factor is a ratio between a third value in a third histogram bin in the first region of the histogram and a corresponding fourth value of the normalized histogram.

14. The method of claim 10, further comprising, in response to determining that the second value is outside of a range between the upper bound and the lower bound, assigning a default value as the scaling factor.

15. A time-of-flight (ToF) ranging system comprising:

a ToF sensor configured to emit light pulses and to generate a histogram based on reflected light pulses, wherein the histogram comprises a cross-talk signal and a target signal, wherein the target signal is generated by reflected light pulses from a target of the ToF ranging system, wherein the cross-talk signal is generated by reflected light pulses from a cover glass of the ToF ranging system; and a processor coupled to the ToF sensor, wherein the processor is configured to:

find, in a first region of the histogram, a rising edge having a gradient, wherein the gradient is larger than a threshold or is a maximum gradient in the first region, wherein the rising edge is in a first histogram bin having a first value;

determine a second value of a second histogram bin in the first region, wherein the first histogram bin precedes the second histogram bin by a pre-determined number;

estimate, based on the first value and the second value, a ratio between the first region of the histogram and a pre-stored light pulse shape, comprising:

comparing the second value with the first value; and in response to determining that the second value is smaller than the first value:

checking if the first value is between an upper bound and a first lower bound; and in response to determining that the first value is between the upper bound and the first lower bound, generating the estimate of the ratio by multiplying the first value with a first pre-determined scaling factor;

scale the pre-stored light pulse shape with the estimated ratio;

subtract the scaled pre-stored light pulse shape from the histogram; and estimate a distance of the target using the histogram after subtracting the scaled pre-stored light pulse shape from the histogram.

16. The ToF ranging system of claim 15, wherein the first region includes a plurality of histogram bins around a reference zero-point histogram bin, wherein a distance of the reference zero-point histogram bin corresponds to a distance between a ToF emitter of the ToF ranging system and the cover glass of the ToF ranging system.

17. The ToF ranging system of claim 16, wherein the pre-stored light pulse shape is a normalized histogram of light pulses emitted by the ToF sensor.

18. The ToF ranging system of claim 15, further comprising, in response to determining that the first value is above the upper bound or below the first lower bound, assigning a pre-determined default value as the estimate of the ratio.

19. The ToF ranging system of claim 15, wherein estimating the ratio further comprises:

in response to determining that the second value is larger than the first value:

checking if the second value is between the upper bound and a second lower bound; and in response to determining that the second value is between the upper bound and the second lower bound, generating the estimate of the ratio by multiplying the second value with a second pre-determined scaling factor.

20. The ToF ranging system of claim 19, further comprising, in response to determining that the second value is above the upper bound or below the second lower bound, assigning a pre-determined default value as the estimate of the ratio.

* * * * *